United States Patent
Lee et al.

(10) Patent No.: US 7,067,229 B2
(45) Date of Patent: Jun. 27, 2006

(54) CONDUCTIVE POLYMERS SUBSTITUTED WITH ACID LABILE FUNCTIONAL GROUPS FOR INCREASING ELECTRICAL CONDUCTIVITY AND PATTERNABILITY AND COMPOSITION HAVING THE SAME

(75) Inventors: Suck-Hyun Lee, Gwacheon-si (KR); Chan-Woo Lee, Suwon-si (KR)

(73) Assignee: Para Limited, Kyungki-do (KR)

( * ) Notice: Subject to any disclaimer, the term of this patent is extended or adjusted under 35 U.S.C. 154(b) by 53 days.

(21) Appl. No.: 10/472,877

(22) PCT Filed: Feb. 26, 2002

(86) PCT No.: PCT/KR02/00312

§ 371 (c)(1),
(2), (4) Date: Apr. 6, 2004

(87) PCT Pub. No.: WO02/077070

PCT Pub. Date: Oct. 3, 2002

(65) Prior Publication Data

US 2004/0166435 A1    Aug. 26, 2004

(30) Foreign Application Priority Data

Mar. 23, 2001  (KR) ............................. 2001-15208

(51) Int. Cl.
*G03F 7/04*    (2006.01)
(52) U.S. Cl. .................. 430/270.1; 430/905; 252/500; 525/540; 528/422
(58) Field of Classification Search ............ 430/270.1, 430/905; 252/500; 525/540; 528/422
See application file for complete search history.

(56) References Cited

U.S. PATENT DOCUMENTS

| 5,554,717 | A | | 9/1996 | Afzali-Ardakani et al. . 528/229 |
|---|---|---|---|---|
| 6,030,550 | A | * | 2/2000 | Angelopoulos et al. ..... 252/500 |
| 6,045,977 | A | * | 4/2000 | Chandross et al. .......... 430/311 |
| 6,685,853 | B1 | * | 2/2004 | Angelopoulos et al. ..... 252/500 |
| 2003/0027079 | A1 | * | 2/2003 | Elian ......................... 430/311 |
| 2004/0162397 | A1 | * | 8/2004 | Lee et al. ................... 525/420 |
| 2005/0230668 | A1 | * | 10/2005 | Lee et al. ................... 252/500 |

* cited by examiner

*Primary Examiner*—John S. Chu

(57) ABSTRACT

The present invention relates to a conductive polymer. The present invention provides a conductive polymer substituted with acid labile functional group comprising an amine functional group and acid labile functional group which plays a protecting role substituted to the amine functional group of a conductive polymer. The conductive polymer of the present invention has enhanced physical and mechanical properties with higher solubility and conductivity than a conventional polyaniline or polypyrrole composition, and also, has improved transparency, sensitivity, adhesive property and patternability. Moreover, the conductive polymer of the present invention has the higher electrical conductivity of the minimum 10 times and the most maximum 102 S/cm than the previous polyaniline, and accordingly, can be used for photosensitive material such as fiber, coating, electrode, organic semiconductor and the like.

32 Claims, No Drawings

CONDUCTIVE POLYMERS SUBSTITUTED WITH ACID LABILE FUNCTIONAL GROUPS FOR INCREASING ELECTRICAL CONDUCTIVITY AND PATTERNABILITY AND COMPOSITION HAVING THE SAME

CROSS-REFERENCE TO RELATED APPLICATION

This application claims priority from International Application PCT/KR02/00312, filed Feb. 26, 2002, which in turn claims priority from Korean Patent Application 2001/15208, filed Mar. 23, 2001.

TECHNICAL FIELD OF THE INVENTION

The present invention relates to conductive polymers, and more particularly it relates to conductive polymers substituted with functional group for increasing electrical conductivity and patternability and Composition having the same.

CONVENTIONAL ART OF THE INVENTION

Research of conductive polymers was launched in late sixties and conductive polymer began to attract attention by discovering, that while adding electron donor or electron acceptor to polyacetylene as it called doping in 1977, the polymer has electrical conductivity in accordance with metal. Similar research was applied to various conductive polymers such as polyaniline, polypyrrole, polythiophene, and polyphenylenevinylene and progressed up-to-date.

Among that, polyaniline may be classified as a completely reduced form, leuco-emeraldine, as a partly oxidized form, emeraldine, and as a completely oxidized form, pernigraniline.

The polyaniline with emeraldine form has advantage that its electrical property may be adjusted in a broad range by oxidation or acid-adhesion of polymer backbone and structural property of dopants and that it is stabilized in air or aqueous solution and has relative inexpensiveness. But, its low insolubility and unmeltability under heating conditions resulted in limiting its processability extremely. Accordingly its commercial use is limited.

Polyaniline should have at least over 1 S/cm (Siemens/cm) of electrical conductivity in order to directly use it as IC or material for shielding from electronic wave. But, to satisfy this condition, it must convert to emeraldine salt form by doping it or adding a separate oxidizing agent.

Also, conventional conductive polymers including the polyaniline have insolubility and unmeltability in ordinary organic-solvents and as a result such solvents are limited in manufacturing of films, and their compatibility. In order to improve electrical conductivity, mechanical property of matter and processability, additives must be added separately. But this becomes an obstacle to manufacturing of fine patterns which can require simultaneous aggregation of various additives. To overcome this problem, various methods have been suggested.

In recent years the research, with regard to method for reforming the conductive polymer and common polymers into complexes with enhancing electrical conductivity through simple mixing and graft copolymer or derivative synthesis, was reported.

Moreover, the composition, which can form a hydrogen bond with polyaniline, contains phenol substituent with interaction between rings and organic acid, metal salt and the like for enhancing processability and can be processed in liquid phase, was reported (U.S. Pat. No. 5,520,852). But if this composition contains polyaniline over 15% by weight, it became gelatinous due to intermolecular hydrogen bond. As a result the composition has disadvantage of being difficult to obtain a desired concentration of polyaniline.

To overcome the disadvantage, a method for processing conductive polymer comprising adding gel inhibitor such as secondary amine into gelated composition was filed (U.S. Pat. No. 6,099,907 and U.S. Pat. No. 6,123,883). On the other hand, using gel inhibitors makes it more difficult to stabilize electrical conductivity (hereinafter referred to as conductivity) and has the disadvantage of deteriorating mechanical properties.

Furthermore, research of increasing solubility and processibility of conductive polymer by applying di-isooctyl phosphate into the polymer as plasticizer was reported (Laska, J J. Appl. Poly. Sci., Sci., 61: 1339–1343, (1996), Materials Science Forum, 122: 177~184(1993)). But, this polymer has the disadvantage of reducing conductivity resulting from using plasticizers such as di-isooctyl phosphate as a trade-off for increasing compatibility with common polymers and its solubility.

As another method for enhancing conductivity of conductive polymers, the research with regard to the method of doping conductive polymers with organic acid dopants such as dodecylbenzenesulfonic acid (hereinafter referred as DBSA), camphorsulfonic acid (hereinafter referred as CSA) having high molecular weight was reported (Heeger Synth. Met., 48, 91 (1992)). Manufacturing of such complexes is also reported. In the research describing exposing light into polypyrrole, a complex of non-conductive polyvinylchloride (PVC), and having $FeCl_3$ on the substrate, selectively exposed $FeCl_3$ was converted into inert iron salt and as a result only unexposed part was doped with $FeCl_3$.

Another published work describes that conductivity of polymer can be enhanced at best to 0.1 S/cm by exposing triphenylsulfonium hexafluoroantimonate (TPSFPA) as photo-oxygen reagent and polyaniline with nonconductor form and doping the polymer with producing acid was published (Angelopolous "Conducting polymers as Lithographic Materials" Polymer Eng.&Sci., vol. 32, No. 20, pp. 1535~1540(1992)).

U.S. Pat. No. 6,045,977 describes the application of polyaniline film assuming patternability and conductivity by exposing polyaniline doped with acid and photo-base reagent to light and exposed selectively by light-induced base.

But $FeCl_3$ as inorganic component, TPSFPA and photo-induced doping method by photo-base reagent mentioned above has difficulty of compatibility owing to extremely low insolubility with a solution of conductive polymers. Besides the polymer has difficulty of doping, due to the conductive polymer's absolving, of lowering efficiency of photo-acid production over some exposed light and of making pattern because of slight solubility difference.

U.S. Pat. Nos. 5,756,601; 5,100,977; 5,237,023; 5,254,670 and 5,250,639 show the possibility of using conductive polymers as materials for shielding electronic waves and for preventing static electricity by synthesizing polyaniline soluble in organic solvents through a reaction among alkylation, alkoxylation induced from amine functional group of polyaniline. But these polymers have disadvantage of reduced linearity of the backbone, of lowered crystallinity and of lowered electrical conductivity resulted from inducing substituents with lower molecular weight into the backbone of the conductive polymer permanently.

In another example, electrical conductivity and processability of a polymer can be enhanced by synthesizing polyaniline substituted with acid/thermal labile tert-butyloxycarbonyl(t-BOC) protection group using a palladium metal catalyst (Xiao-Xiang et al. J. Am. Chem. Soc. 2000, 122, 7606–7607). But in this research t-BOC group did not substitute polyaniline emeraldine salt composing amine to imine 1:1 ratio, the method needed adding proceedure of 185° C. pyrolysis by oxidizing partly polyaniline of leucoemeraldine form to produce polyaniline emeraldine salt and t-BOC group has linear form prior to pyrolysis. As a result, it has disadvantage of difficulty maintaining crystallinity or linearity of polyaniline emeraldine salt.

Accordingly, the polymer synthesized by using the palladium metal catalyst may settle the disadvantage of insolubility and unmeltability resulted from processing procedure, but it still has low conductivity and has the disadvantage of low expectation for its enhancement.

As mentioned above, in order for conductive polymer to be applicable for IC and material for shielding electronic wave or for preventing static electricity, the polymer needs improvement of conductivity, solubility and physical/mechanical properties. Especially, development of photo-sensitive polyaniline/polypyrrole derivatives having influenced transparency without particles about several μm or aggregates, high-sensitivity and patternability and of doping technique have been needed to manufacture IC through photolithography techniques urgently. But most conductive polymers co-exist in various chain forms because they linked consequently through firm conjugated double bonds and they lack spinning or fluidity of inter-linkage. It is preferable that a polymer chain can transform linear structure to cis-formed linked structure, but it is difficult to produce transformed structure in real processing. It is the reason why it is difficult to synthesize polyaniline with high metallic conductivity, meaning that polyaniline having crystalline chain structure arrayed regularly conductive polymer chain form like a rod is difficult to form.

Also, it needs not only high electrical conductivity but also low light absorbance to an exposed light wave and remarkable soluble difference to a pattern solution according to doping or not by selective exposed light for these polymers, to be directly used in manufacturing of IC.

DISCLOSURE OF INVENTION

It is a principal object of the present invention to provide a conductive polymer with enhanced conductivity and patternability for photo fine-processing (lithography) and a composition containing the polymer. As mentioned above, by adding photo-acid generating reagent into polymer substituted with acid labile functional group as a protection group, the produced acid can induce de-protection reaction providing chemical amplification reaction. According to this principle, the present inventors can produce the polymer with influenced conductivity and patternability by inducing the acid labile functional group into conductive polymer to induce linear chain form of a backbone of the polymer enabling effective doping.

Accordingly, the present invention provides a conductive polymer composition having high solubility, conductivity and superior physical/mechanical properties such as enhanced transparency required in photo fine-processing techniques, high-light-sensitivity, and infrared adhesion and patternability compared to conventional polyaniline/polypyrrole composition. As a result, the composition of the present invention is applicable to various usages such as IC and material for shielding electronic wave or for preventing static electricity.

In a first aspect, the present invention provides a conductive polymer substituted comprising an amine functional group and an acid labile functional group, as protection group, substituted for the amine functional group of the polymer.

It is desirable that the conductive polymer is selected from the group consisting of polyaniline or polypyrrole regardless of substituents and the polyaniline in emeraldine salt form. Further, it is desirable that the acid labile functional group is substituted to the amine functional group of the polymer with a ratio 1%~99% by number. It is desirable that the functional group is selected from tert-butyloxycarbonyl(t-BOC) and tetrahydropyran(THP) and the polymer substituted with the functional group has a number average molecular weight of 1000 to 100,000.

In another aspect, the present invention provides a conductive polymer composition comprising:

An electrically conductive polymer containing an amine functional group and an acid labile group as a protection group substituted for the amine group; and A soluble self-orienting material of monomer form, which mixed with said polymer at the ratio of 10:90 to 90:10 by weight, comprises General formula 1 below.

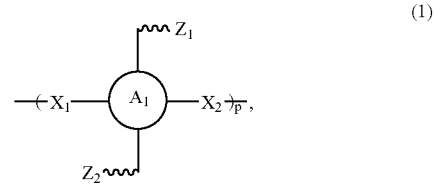

wherein p is an integer of 1 and more; A1 is an aromatic ring; X1 and X2 are independently selected from the group consisting of —SO$_2$OH, —COOH, -CO2 and -SO3; Z1 and Z2 are independently selected from a hydrophilic group, a hydrophobic group or an amphiphilic group.

In another aspect, the present invention also provides a conductive polymer composition comprising:

An electrically conductive polymer containing an amine functional group and an acid labile group as a protection group substituted for the amine group; and A soluble self-orienting material of metal salt form, which mixed with said polymer at the ratio of 10:90 to 90:10 by weight, comprises General formula 2 below.

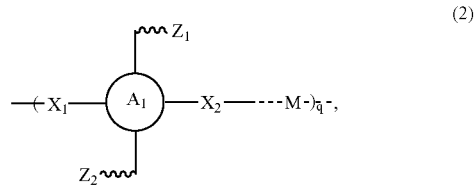

wherein q is an integer of 1 or more; A1, X1, X2, Z1, and Z3 are defined in general formula 1; M is an alkali metal or a transition metal of cation form.

In another aspect, the present invention also provides a conductive polymer composition comprising:

An electrically conductive polymer containing an amine functional group and an acid labile group as a protection group substituted for the amine group; and A soluble self-orienting material of whole-aromatic polymer form, which mixed with the polymer at the ratio of 10:90 to 90:10 by weight, comprises General formula 3 below.

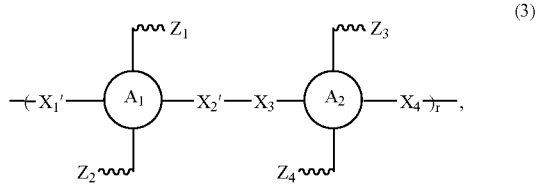

(3)

wherein r is an integer of 1 or more; A1 is defined in general formula 1; X1' and X2' are independently selected from the group consisting of —$SO_2$, —CO; X3 and X4 are independently selected from the group consisting of —O— and —NR, wherein R is a side chain independently selected from the group consisting of —H, —$SO_3H$—$CO_2H$, —$(CH_2)_n SO_3H$, —$(CH_2)_n CO_2H$ or -tert-butyloxycarbonyl; Z1 to Z4 are independently selected from a hydrophilic group, a hydrophobic group or an amphiphilic group.

The composition may contain a dopant material 1–50% by weight on the basis of the composition consisted of the polymer and the soluble self-orienting material. It is still further desirable that the dopant material is selected from an inorganic or organic photo-acid generating reagent regardless of the photo-acid generating reagent. Also it is further desirable that the inorganic photo-acid generating reagent is triphenylsulfoniumhexafluoroanthimonate and the organic photo-acid generating reagent is trifluorosulfonyloxynorvoneneimide.

As above mentioned, adding photo-acid generating reagent into the conductive polymer composition of the present invention produces acid induced deprotection reaction to accompany chemical amplification reaction.

In the conductive polymer composition, it is desirable that the acid labile functional group is 5–10% by weight on the basis of total composition.

Also the composition further comprises thermoplastic resin, thermostatic resin and complex thereof for using it as processing manufacture. In using for processing manufacture, it is desirable that added polymer is 10~90% by weight on the basis of total composition.

Additional features and advantages of the present invention are described in, and will be apparent from, the detailed description of the presently preferred embodiments.

DETAILED DESCRIPTION OF INVENTION

The present invention relates to composition (hereinafter referred as ACP composition) comprises:

A conductive polymers substituted with an acid labile functional group as a protection group (hereinafter referred as ACP); and A soluble self-orienting material (hereinafter referred as SOM), as an additive for enhancing electrical, optical and mechanical properties of the ACP, developed by the applicants.

The conductive polymer may be selected from polyaniline or polypyrrole with an amine functional group. The acid labile functional group may be selected from the t-BOC or the THP and be substituted for the amine functional group once or twice per repeat unit of the polymer. That is, it is desirable that the acid labile functional group is 1–99% by number of the total amine functional group of the polymer. The SOM, as an additive material for improving conductivity, transparency and adhesive property of the polymer, consisting of the ACP composition can be selected from an SOM of monomer form identified by General Formula 1 below, a SOM of metal salt form identified by General Formula 2 and whole-aromatic polymer form identified by General Formula 3.

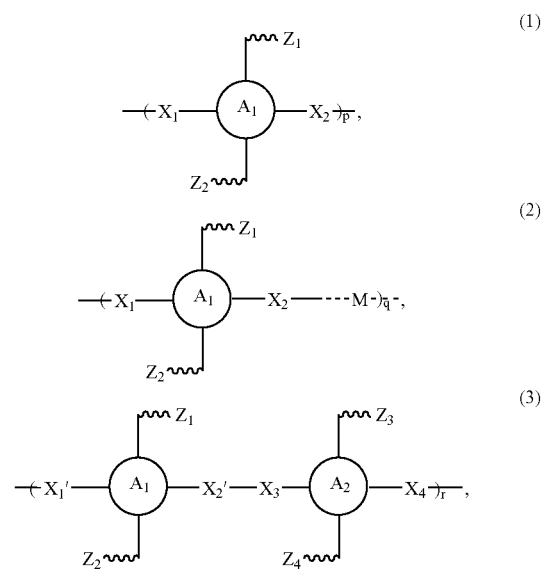

weherein p, q, or r in General formulas 1, 2, 3, respectively, are integers 1 or more; A1, A2 is an aromatic ring; X1 and X2 are functional groups independently selected from —$SO_2OH$, —COOH, —$CO_2$ or —$SO_3$; M in General formula 2 is an alkali metal or a transitional metal of cation form; X' and X2' in General formula 3 are independently selected from -SO2- or —CO—; X3 or X4 in General formula 3 are functional groups independently selected from —O, —NR—, where in R is a side chain selected from —H, —COOH, —$(CH_2)_n SO_3H$, —$(CH_2)_n COOH$, and tert-butyloxycarbonyl; and Z1 to Z4 are independently selected from a hydrophilic group, a hydrophobic group or an amphiphilic group.

It is desirable that A1 is independently elected from phenyl, naphthyl, biphenyl (Φ-Φ; Φ=$C_6H_5$), benzophenone (Φ-CO-Φ), benzanilide (Φ-CONH-Φ), phenylether (Φ-O-Φ), phenylsulfide (Φ-S-Φ), phenylsulfone (Φ-$SO_2$-Φ) and phenylsulfoneamide (Φ-$SO_2NH$-Φ) and that A2 is independently selected from phenyl, naphthyl and biphenyl.

Also Z1 to Z4 comprise —H and at least one of them is a side chain with a length of 2–30 containing carbon, nitrogen, sulfur or oxygen. It is desirable that the side chains are alkyl, alkenyl, alkynyl or alicyclic derivatives selected from the group consisting of —$(CH_2)_n CH_3$, —O—$(CH_2)_n CH_3$, —$O(CH_2)_n OCH_3$, $(OCH_2CH_2)_n OCH_3$ (wherein n is an integer of 1–24). It is more desirable that a terminal end of the side chain consist of sulfonic acid (—$SO_3H$), carboxylic acid (—$CO_2H$), benzene sulfonic acid (—$OC_6H_4SO_3H$), benzene carboxylic acid (—$OC_6H_4CO_2H$), azacrownether, carbazole and thiol (—SH).

It is desirable that M in general formula 2 is independently selected from $Li^+$, $Na^+$, $K^+$, $Cu^{2+}$, $Zn^{2+}$, $Cd^{2+}$, $Mg^{2+}$, $Pb^{2+}$, $Mn^{2+}$, $Fe^{2+}$, $Ca^{2+}$, $Fe^{3+}$, $Ti^{4+}$, $Zr^4+$ and $Mn^{7+}$ and that the SOM with whole aromatic polymer form is a linear copolymer material comprising at least one of poly-p-phenyleneterephthalate, poly-p-phenyleneterephthalamide, poly-2,6-naphthaleneterephthalate, poly-2,6-naphthaleneterephthalamide in 1–30% by a molar ratio.

The SOM has no limit of molecular weight and may be mixed in composition of 1–95% by weight according to requiring electrical conductivity. For example, if the number average molecular weight of the conductive polymer is less than 5,000, it can enhance mechanical property and electrical conductivity of the composition by raising the molecular weight of the SOM by more than 0.2 g/dl (NMP) of intrinsic viscosity and by increasing contents of SOM to 85% by weight. On the other hand, if the number average molecular weight of the conductive polymer is more than 10,000, molecular weight or contents of the SOM can be lower to 5% within the range of mechanical, physical properties. Accordingly, the ACP has the number average molecular weight of 1000–100,000. Also the ACP composition may further comprise dopant materials, which can be used as a photo-acid generating agent with property of generating acid by light.

Conventionally the photo-acid generating agent has disadvantage of insolubility within the conductive polymer. An ACP composition of the present invention comprises the SOM which play a role of enhancing solubility of the photo-acid generating agent in conductive polymer. As a result, the conductive polymer can be used for improving photo fine-processing technique by adding the photo-acid generating agents into the ACP composition. That is, on irradiating light into the ACP composition containing the photo-acid generating agent, it can achieve photo fine-processing techniques resolution of less than 0.35 μm and has electrical conductivity of more than 100 S/cm, which is at least 10 times as high of electrical conductivity as of conventional polyaniline. Therefore, the ACP composition of the present invention can be used for photo-sensitive materials with various applications such as conductive film, fiber, coating, electrode or organic semiconductor. However, it is desirable that the composition has contents of the ACP at least 15% by weight, more desirably 50–85% by weight, to have higher electrical conductivity than conventional conductive polymers.

In regard to the above, comparison of the electrical conductivity of film form composition sample, which is a mixture with ACP and SOM of polymer form of 80:20 by weight and doped with another SOM containing strong acid such as sulfonic acid, with that of an ACP sample not containing SOM showed electrical conductivity of 150 S/cm and 3 S/cm, respectively. So the sample doped with the SOM had approximately 50 times as high electrical conductivity as sample not treated with the SOM. However, if the contents of the SOM with polymer and monomer form is more than 30% by weight on the basis of the total ACP composition, the electrical conductivity decreases. It is very important to adjust the contents of the SOM in the ACP composition in regard to conductivity.

Generally, the conductive polymer can be used as antistatic materials, static discharge materials or EMI shielding materials, battery electrode, semiconductor and solar battery in accordance with electrical conductivity of $10^{-13}$~$10^{-7}$ S/cm, $10^{-6}$~$10^{-2}$ S/cm or more than 1 S/cm, respectively. The conductive polymer of the present invention has electrical conductivity in the range of 10–8 to 10 S/cm in proportion to the contents of the SOM and a doping method. Accordingly, the polymer of the present invention can be applied to more broad usage such as transparent electrode, anti-corrosion, UV absorbent, etch mask layer for lithography of conventional semiconductor processing.

Dopants such as well known any inorganic or organic acid may be used in the ACP composition of the present invention to improve electrical conductivity and the conductivity can be influenced in accordance with conjugate bases and acidic salts. The dopant material can be polyphenylalkylamidesulfonic acid, hydrochloric acid or camphorsulfonic acid.

For example, the ACP composition manufactured by mixing the SOM comprising polyphenylalkylamidesulfonic acid as dopant with the ACP and polyalkylamide with polymer form can enhance not only electrical conductivity of the ACP composition but also processability, mechanical properties and stability of the conductivity. In this case, the SOM adding into ACP composition can be used independently or compositely according to the function of dopants. In case of using the SOM compositely, if the SOM has intrinsic viscosity (0.1 g/dL, NMP) of at least 0.2 g/dL and occupies contents with more than 10% by weight, the contents of additional SOM can be lower. Also in case the ACP composition of the present invention comprises photoacid generating agents, additional dopants may not be used. However, dopnats can be used for improving the electrical conductivity of the patternable polymers through photo fine-processing procedure after irradiating by light.

In case of using the photo-acid generating agent as dopant, its effect can be the greatest by raising the contents of the agent. The photo-acid generating agent in the present invention may be inorganic or organic material independently or compositely. The contents of photo-acid generating agent added into the ACP composition are regulated in accordance with the degree of substitution of acid labile functional group such as the t-BOC. It is particularly desirable that the agent is used in 5–15% by weight on the basis of total weight corresponding to mole number of acid labile in the conductive polymer.

The representative inorganic or organic photo-acid generating agent is TPSFPA or trifluorosulfonyloxynorborneneimide (TFSBI), respectively. The TPSFPA has a function of deprotection rather than being a dopant because of low solubility and thereby difficulty of adding more than 3% by weight. On the other hand, TFSBI has functions of deprotection and being a dopant because of enhanced solubility and thereby adding to 15% by weight. On irradiating the composition with added TFSBI in light with a wavelength of 345 nm or 436 nm, there happened deprotection reaction of the acid labile functional group by produced trifluorosulfonic acid. Deprotected t-BOC functional group decomposed into CO2 and t-BOC cation, which further decomposed into isobutylene and proton. The t-BOC functional group is taken apart continuously by deprotection reaction resulted from chemical amplifying reaction by produced proton and trifluorosulfonic acid. Accordingly on completing the irradiation, the protection groups are decomposed to vanish and the ACP was doped to have high electrical conductivity.

In case of using polymer responding quantitatively to amine group per repeating unit, the substitution ratio of the protection group to the amine group existed in the ACP composition are measured to be relatively high. On the other hand, if the acid labile functional group is excessively substituted in fine-processing procedure for being used in IC manufacture, the group may be soluble in patterning solution before being deprotected. Consequently, it is desirable that the contents of the functional group is 5–10% by weight, that is, 50% substituted for every two amine functional group of the repeating unit.

However, in case of doping polyaniline with HCl, it is known that the composition has maximum electrical conductivity for not more than 20% doping ratio (percentage), which is defined by [C1]/[N, total number]×100 and that it has reduced conductivity if overdoped by more than 50% of said doping ratio (Chiang, MacDiarmid Synt. Met. 13, 193–205, 1986).

It is very important for the ACP composition of the present invention to maintain regulated doping ratio of inducing acid labile functional group. It is the reason why the contents of the photo-acid generating agent are regulated in proportion to the acid labile functional group and that the agent play a role of inducing doping. Particularly, the ACP substituted with the acid labile functional group such as t-BOC or THP has much better soluble property than conductive polymer not induced with the protection group in ordinary organic solvent such as chloroform.

Also the ACP protection group has increased electrical conductivity up to 250 S/cm, and even more than 1000 S/cm when using bissulfonic acid monomer (General formula 9 below) as a dopant, because of induced self-doping resulted from selective deprotection process owing to chemical amplifying reaction by the dopant and the photo-acid generating agent.

Particularly, according to the present invention, the ACP composition it can be applied directly to manufacturing of IC because it shows extremely selective soluble property to patterning solution before/after doping with regard to alkali solution/organic solvent patterning solution used generally in fine-processing procedure.

The ACP composition of the present invention shows photo-absorbance of less than 0.45 per 1 μm thickness at 365 nm and 436 nm wavelength measured with UV spectroscopy. Therefore it can be applied as a fine-processing technique using the exposed light source of 365 nm (I-line) and 436 nm (G-line) as a light source being used for IC manufacturing.

The present invention can be applied to manufacturing of electrode patterning of organic semiconductors, i.e. organic luminous body and Field Effects Transistors. Also, in manufacturing organic film, a conventional organic solvent such as NMP or meta-cresol has complicated drying procedure and reduces electrical conductivity resulted from basic and high boiling points. On the other hand, the conductive polymer of the present invention can be soluble in a chloroform solvent with low boiling point and thereby have excellent adhesive property with regard to a silicon wafer and a glass matrix and excellent mechanical property such as being able to endure scratches.

Also, in case of manufacturing using a conventional conductive polymer, if concentration of the polymer increases, a gel-inhibitive must be added to the polymer to prevent gelation resulted from hydrogen bond between amine functional groups in the polymer. However, according to the present invention it is not necessary to add gel-inhibitive because of no hydrogen bond by function of the t-BOC functional group. Besides in case of the method for doping the polymer with monomolecular acid like sulfonic acid, the polymer complex shows insolubility and unmeltability and have poor processability and conductivity. As mentioned above, the protection group in the ACP polymer of the present invention is deprotected by chemical amplifying reaction to produce sulfonic acid, carboxylic acid or hydroxyl group and to induce self-doping method. Consequently the polymer has very high electrical conductivity because of effective self-orienting by intermolecular hydrogen bond with the SOM.

In a case of doping the composition of the present invention with nickel, aluminum, copper, steel, zinc, cobalt, lead, chrome, niobium, nobelium, silver, tantalum, titanium, zirconium and their alloy, the mixture is useful because the acid attached to side chains of the mixture form passivating anodic sites. That meant that by doping the ACP composition by a metal material, polyaniline of the ACP is oxidized by deprotection reaction in accordance with acidic condition of the acid labile protection group. As a result the ACP functions as oxidizing agent in oxidizing reaction with metal and therefore the ACP is desirable as anti-corrosion material because it form passivating anodic site on the surface of the metal.

BEST MODE FOR CARRYING OUT THE INVENTION

To begin, we describe briefly general method for measuring electrical conductivity of manufactured material of the Example below.

<Method to Measure Electrical Conductivity>

Electrical conductivity is measured by a four-line probe method in room temperature with a relative humidity 50%. We used carbon paste for contacting gold wired electrode generally used with thickness of 1~10 μm, and measured electrical current (i), two external electrodes and voltage (v) from filmic sample (thickness: t, width: w) with a thickness of 1~10 μm and electrical conductivity with regard to distance (d) between two internal electrode with Keithley conductivity measurement apparatus. Electrical conductivity was calculated by below formula and units of electrical conductivity are in Siemen/cm or S/cm.

Electrical conductivity=$(l \times i)/(w \times t \times v)$

To certify whether the samples have uniform electrical conductivity, after fabricating samples, the conductivity was measured by Van der Pauw method, which is a standard four points probe. The measurement results show uniform conductivity within 5% and no ununiformity on the film surface. All samples were dried in vacuum for reducing to reduce the electrical conductivity increase by remained solvent with relative humidity maintained at 50%.

Hereinafter, we describe in detail manufacturing methods for ACP/ACP composition and method for forming fine patterning. In Example below, the polymer material is ACP or ACP composition of the present invention.

EXAMPLE 1

Example 1 is with regard to a process for synthesizing the t-BOC polyaniline and THP polyaniline.

Polyaniline was synthesized by MacDiarmid method (MacDiarmid et al. Conducting Polymers Ed. by Alcacer, Dordrecht, 105, 1987). Into Erlenmeyer flask was placed distilled, purified aniline 10 ml and 1M HCl solution 600 ml and solution of ammonium peroxide sulfate $((NH_4)_2S_2O_8)$ 5.6 g dissolved in 1 M HCL 200 ml was added into the flask with stirring for 15 min. 2 hr. after filtering the obtained precipitate with filtering paper, the precipitate is washed with 1 M ammonium hydroxide 100 ml solution, transferred to 0.1 M ammonium hydroxide 500 ml solution, stirred for 20 hours, filtrated and dried with vacuum pump for 48 hrs to form the polyaniline emeraldine base 1.5 g. After dissolving the emeraldine base 1.0 g ($5.5\times10^{-3}$ mol) and di-tert-butyldicarbonate (D-t-BOC) 4.8 g ($2.2\times10^{-2}$ mol) in NMP 50 ml, pyridine 10 ml was added into the solution with stirring at 75° C. for 3 hrs. After filtering the reaction product by precipitating in excessive water and washing the product in composite solution of water/methanol with 1:1 ratio, the purified t-BOC polyaniline 1.3 g was obtained.

The substitution degree of the polyaniline per repeating unit can be regulated as follows. Mono-substituted t-BOC polyaniline, shown in General formula 5 below, consisting of two amino group per repeating unit shown in General formula 4 below and di-substituted t-BOC polyaniline, shown in General formula 6, out of two amino group per repeating unit shown in General formula 4 can be synthesized quantitatively by reacting D-t-BOC with the emeraldine base in molar ratio of 2:1 and 4:1, respectively. General formulas 4, 5 and 6 are shown below:

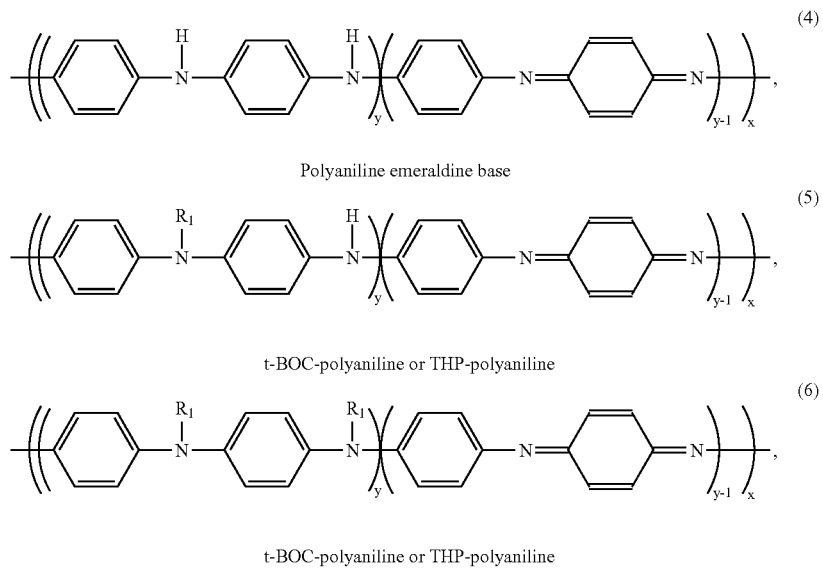

Polyaniline emeraldine base (4)

t-BOC-polyaniline or THP-polyaniline (5)

t-BOC-polyaniline or THP-polyaniline (6)

wherein R1 is t-BOC or THP; x and y are positive integers, x is more than y.

Moreover, conductive polymer substituted with THP was synthesized as follow. After dissolving polyaniline emeraldine base 1 g and dihydropyran (DHP) 0.93 g ($1.1\times10^{-2}$ mol) in NMP 50 ml, p-toluene sulfonic acid catalyst 30 mg was added and the solution was reacted at 25° C. for 14 hours to synthesize the THP-polyaniline.

Absorbance measured by UV spectroscopy for the t-BOC substituted polymer showed a typical t-BOC group absorbance band of 2900, 1720, 1690, 1300, and 1100 cm$^{-1}$ and the THP substituted polymer shows typical THP group absorbance band of 2900, 1350, and 1100 cm-1. Therefore we identified that the polymer was substituted with acid labile functional group. Analysis of the substituted polymer with DSC (Differential Scanning Calorimeter) and TGA (Thermo Gravimetric Analyzer) showed the polymer glass transition point and pyrolysis point at 150° C. due to the t-BOC group. The polymer had the number average molecular weight of 10,000 by GPC (Gel Permeation Chromatography).

The substituted polymer contained an acid labile functional group at 5~15% by weight, and preferably 6–10% by weight when mono-substituted.

The conductive polymer had favorable characteristics as a film material and showed relatively low photo-absorbance of less than 0.5 per 1 μm measured by UV spectroscopy at 365 nm and 436 mm. So the polymer can be utilized as a photosensitive polymer using exposed light source of I-line and G-line.

Before deprotection reaction, the ACP of the present invention was well soluble in organic solvent such as cyclohexanone and anisole. On the other hand after deprotection, it showed insolubility. That means that the solubility of the polymer changed drastically in proportion to a polarity change in accordance with deprotection. Therefore, by irradiating light selectively based on this property, the polymer can be used as photosensitive materials capable of formation of fine patterning.

EXAMPLE 2

Example 2 is with regard to a process for synthesizing t-BOC polypyrrole or THP polypyrrole polymers.

Polypyrrole 1.0 g was obtained by vacuum drying 5% polypyrrole aqueous solution (Aldrich co.). After dissolving the obtained polypyrrole 1.0 g and D-t-BOC 2.4 g ($1.1\times10^{-2}$ mol) in NMP 50 ml, pyridine 10 mg was added and the solution was stirred at 75° C. for 24 hrs.

After filtering the reaction product by precipitating in excessive water and washing the product in a composite solution of water and methanol of 1:1 ratio, the purified t-BOC polypyrrole 2.5 g (45% yield) was obtained. The conductive polymer substituted with the THP was synthesized by using the synthesis process illustrated in Example 1 above. The obtained polymer, shown in General formula 7, showed a typical vibrating absorbance band of a carbonyl group of the t-BOC group and of a C—O group of the THP group by UV spectroscopy to identify the polymer substituted with the acid labile functional group. The polymer had the number average molecular weight, measured by GPC, of 12,000. The General formula 7 is shown below:

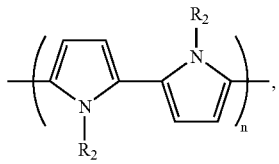

(7)

t-BOC polypyrrole or THP polypyrrole wherein n is a positive integer; R1 or R2 is t-BOC or THP.

Thermal analysis showed that the acid labile functional group of the present invention was contained 5~40% by weight on the basis of the total polymer. Particularly, for the contents of the group being 6~15% by weight, the polymer showed the best electrical conductivity. Every conductive polymer showed favorable film formability and a relatively low light-absorbance of less than 0.5 per 1 μm, measured by UV spectroscopy at 365 nm and 436 nm. Consequently, the polymer was verified to be adequate for application as a photosensitive polymer using exposed-light source of I-line and G-line.

Before deprotection reaction, the photosensitive material of the present invention was well soluble in organic solvent such as cyclohexanone and anisole. On the other hand after deprotection, it showed insolubility. So, we identified the polarity change by deprotection for drastically changing the solubility of the polymer.

The conductive polymer of the present invention is selected from the substituted/non-substituted polyaniline or polypyrrole, and the polyaniline is emeraldine form.

EXAMPLE 3

Example 3 is with regard to a production of a primary t-BOC polyaniline composition and a process for manufacturing thin-film using the composition.

The primary conductive polymer composition was produced by mixing t-BOC polyaniline (70% by weight) with polyalklyamide (30% by weight), shown in General formula 8 below, as the SOM of polymer form. The composition (blend compound) as a fundamental material was dissolved in a composite solvent composed of meta-cresol and chloroform of 50:50 ratio and by using an ultrasonic syringe, the composition of 12% by weight on the basis of a total solvent was dissolved. Aafter adding photo-acid generating agent TPSFPA 3% or TFSBI 10%, respectively, on the basis of the dissolved basic material compound into the solution, the said solution was filtrated with the filter size of 0.5 μm. After coating the filtered solution on glass and silicon wafer matrix by spinning at 500 rpm for 30 minutes and doping by spinning the solution at 1000 rpm, thin film with a thickness of 1 μm was obtained. Manufactured thin film was prebaked on the hot plate at 40° C. for 10 minutes and the solvent was volatilized by vacuum pump for 24 hrs. Thereby final thin film was manufactured.

The manufactured thin film exposed to a light source of 248 nm wavelength and treated with sulfonic acid monomer shown in General formula 9 below, had electrical conductivity of 145 S/cm. General formulas 8 and 9 are shown below:

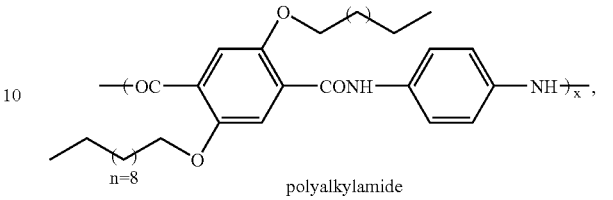

(8)

polyalkylamide

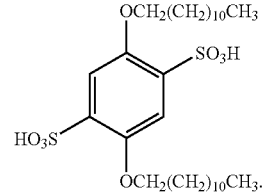

(9)

bis-dodecyloxybenzenesulfonic acid
(bissulfonic acid monomer)

EXAMPLE 4

Example 4 is with regard to a production of a secondary t-BOC polyaniline composition and process for manufacturing thin-film using the composition.

the secondary conductive polymer composition was produced by mixing t-BOC polyaniline (50% by weight) with polyalkylamide (30% by weight) and polyphenoxyalkyl-maidesulfinic acid, shown in General formula 10 below, as the SOM of whole aromatic ring form. The composition as a fundamental material was dissolved in a composite solvent composed of meta-cresol and chloroform of 50:50 ratio and by using the ultrasonic syringe, the composition of 15% by weight on the basis of the total solvent was dissolved. And then the solution was filtrated using the filter size of 0.5 μm. After coating the filtered solution on glass and silicon wafer matrix by spinning at 500 rpm for 30 minutes and doping by spinning the solution at 1000 rpm, thin film with thickness of 1 μm was obtained. Manufactured thin film was prebaked on the hot plate at 80° C. for 10 minutes and the solvent was volatilized b vacuum pump for 24 hrs. Thereby final thin film was manufactured.

Analysis of the obtained deprotection polymer identified vanishing of a carbonyl functional group, which is the t-BOC protection group and appearing of an —NH band with ammonium ion form doped by proton acid induced from the t-BOC protection group and added polyphenoxy-alkylamidesulfonic acid. The film had electrical conductivity of 78 S/cm. The General formula 10 is shown below:

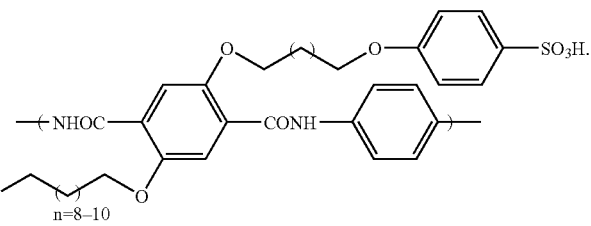

(10)

polyphenoxyalkylamide sulfonic acid

EXAMPLE 5

Example 5 is with regard to a process for making a fiber by using the secondary t-BOC polyaniline composition.

To make the fiber, a tip of a capillary tube manufactured by applying electro spinning had a diameter of 0.5 mm and thereby an induced perpendicular injection. A collection apparatus for the injected polymer fiber had a diameter of 6 cm with cylinder form and was rotated at 3000 rpm. A cathode was connected to a tungsten wire in the capillary tube and an anode was connected to the collection apparatus. The electro-spin apparatus was impressed with high voltage of 10 KV, and considering the viscosity of the filtrated composition, the distance between the collection apparatus of the tube was selected. Then the electro-spin apparatus was rotated at 3000 rpm and thereby fiber of light green color with diameter of 12 μm was obtained. After cutting one strand of the fiber to 1 cm and fixing the both ends of the strand with carbon paste, it showed electrical conductivity of 35 S/cm by 2 points probe measurement method.

In addition to the fiber, the ACP composition can be used for manufacturing films, coatings and the like; the composition may further comprise thermoplastic resin, thermosetting resin or complex thereof. The thermoplastic resin or thermosetting resin is a polymer with excellent adhesive property such as polymethylmethacrylate, polyvinylpyrrolydinonone, polyphenyloxide, polycarbonate, polyamide, polyester, polyacrylonitrile, polyacrylonitrile-butadiene-styrene tricopolymer, polyethylene, polypropylene, polystyrene, polyvinyl chloride, polyphenylene sulfide, polyimide or epoxy resin. Preferably, the polymer with adhesive property was added 10~90% by weight on the basis of the ACP composition and more preferably 10~50% by weight.

EXAMPLE 6

Example 6 is with regard to a process for forming fine patterning by using primary t-BOC polyaniline composition.

The thin film of the composition of Example 3 was exposed to light with an exposure apparatus generating light wavelengths of 365 nm and 436 nm, it was post-exposure baked at 100° C. for 10 minutes and was dipping developed in TMAH alkali aqueous solution (2.38%) or cyclohexanone solvent for 60 seconds. Thereby an exposed part or an unexposed part is selectively dissolved to form the fine patterning. Analysis of the obtained deprotection polymer by the thermochenical reaction with IR spectroscopy identified vanishing of a carbonyl functional group, which is t-BOC protection group, and appearing of an —NH band with ammonium ion form doped by proton acid induced from the t-BOC protection group and trifluorosulfonic acid produced from the photo-acid generating agent.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

INDUSTRIAL APPLICABILITY

As mentioned above, the ACP and ACP composition of the present invention show high solubility and electrical conductivity, and show improvement of physical or mechanical property, such as improved transparency, highlight-sensitivity, adhesive property and patternability required for photo-fine processing technique compared with the conventional polyaniline/polypyrrole composition. Accordingly the ACP and ACP composition can be used as material for IC, for shielding electronic wave, for preventing static electricity and the like.

Besides, the ACP and ACP composition have at least 10 times higher electrical conductivity than conventional polyaniline, maximum 102 S/cm, which is applicable to various photosensitive materials such as conductive film, fiber, coatings, electrode, organic semiconductor and the like.

The invention claimed is:

1. A conductive polymer, comprising:
   an amine functional group; and
   an acid labile functional group as a protection group substituted to the amine functional group of the conductive polymer, wherein the acid labile functional group is selected from the group consisting of t-BOC (tert-butoxycarbonyl) and THP(tetrahydrofuran).

2. The conductive polymer according to claim 1, wherein the acid labile functional group substitutes 1–99% of a total number of the amine functional groups of the conductive polymer.

3. The conductive polymer according to claim 1, wherein the conductive polymer has number average molecular weight of 1,000–100,000.

4. The conductive polymer according to claim 1, wherein the conductive polymer comprises acid labile functional group is substituted to polyaniline or polypyrrole.

5. The conductive polymer according to claim 4, wherein the polyaniline is emeraldine base form.

6. A conductive polymer composition, comprising:
   an electrically conductive polymer comprising an amine functional group and acid labile group substituted as a protection group for the amine group; and
   a soluble self-orienting material of monomer form, which is mixed with the polymer at the ratio of 10:90 to 90:10 by weight, comprises General Formula 1 below:

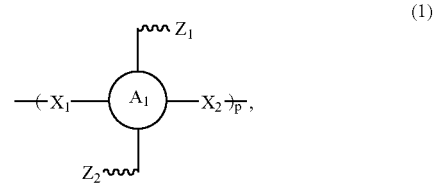

(1)

wherein p is an integer of 1 and more; A1 is an aromatic ring; X1 and X2 are independently selected from the group consisting of —SO$_2$OH, —COOH, —CO$_2$ and —SO$_3$; Z1 and Z2 are independently selected from a hydrophilic group, a hydrophobic group or an amphiphilic group.

7. A conductive polymer composition, comprising:
   an electrically conductive polymer containing an amine functional group and an acid labile group substituted as a protection group for the amine group; and
   a soluble self-orienting material of metal salt form, which mixed with said polymer at the ratio of 10:90 to 90:10 by weight, comprises General Formula 2 below:

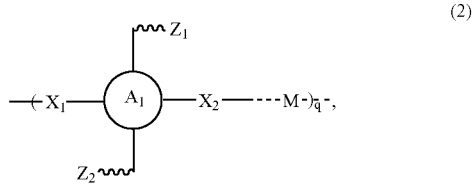

(2)

wherein q is an integer of 1 or more; A1 is an aromatic ring; X1 and X2 are independently selected from the group consisting of —SO$_2$OH, —COOH, —CO$_2$ and —SO$_3$; Z1 and Z2 are independently selected from a hydrophilic group, hydrophobic group or an amphiphilic group; M is an alkali metal or a transition metal of cation form.

8. A conductive polymer composition, comprising:
an electrically conductive polymer containing an amine functional group and an acid labile group substituted as a protection group for the amine group; and
a soluble self-orienting material of whole-aromatic polymer form, which mixed with the polymer at the ratio of 10:90 to 90:10 by weight comprises General Formula 3 below:

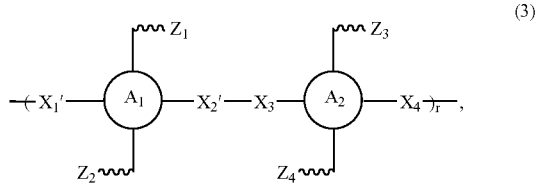
(3)

wherein r is an integer of 1 or more; A1 and A2 are aromatic rings; X1' and X2' are independently selected from the group consisting of —SO$_2$, —CO; X3 and X4 are independently selected from the group consisting of —O— and —NR, wherein R is a side chain independently selected from the group consisting of —H, —SO$_3$H, —CO$_2$H, —(CH$_2$)$_n$SO$_3$H, —(CH$_2$)$_n$CO$_2$H or tert-butyloxycarbonyl; Z1 to Z4 are independently selected from a hydrophilic group, a hydrophobic group or an amphiphilic group.

9. The conductive polymer composition according to claim 6, further comprising a dopant material of 50% by weight of a total weight of the conductive polymer and the soluble self-orienting material.

10. The conductive polymer composition according to claim 9, wherein the dopant material is independently selected from the group consisting of an inorganic photo-acid generating agent, an organic photo-acid generating agent, and a polymeric photo-acid generating agent.

11. The conductive polymer composition according to claim 10, wherein the inorganic photo-acid generating agent is triphenylsulfoniumhexafluoroantimonate.

12. The conductive polymer composition according to claim 10, wherein the organic photo-acid generating agent is triphenylsulfonyloxynorboneneimide.

13. The conductive polymer composition according to claim 10, wherein the polymeric photo-acid generating agent is poly(vinyl chloride).

14. The conductive polymer composition according to claim 6, wherein the acid labile functional group is contained 5–10% by weight of the total composition.

15. The conductive polymer composition according to claim 6, further comprising thermoplastic resin, thermosetting resin or complex thereof for using it as processing manufacture.

16. The conductive polymer composition according to claim 15, wherein the thermoplastic resin, thermosetting resin or complex thereof is contained 10–90% by weight of the total composition.

17. The conductive polymer according to claim 7, wherein the acid labile functional group is contained 5–10% by weight of the total composition.

18. The conductive polymer composition according to claim 8, wherein the acid labile functional group is contained 5–10% by weight of the total composition.

19. The conductive polymer composition according to claim 7, further comprising thermoplastic resin, thermosetting resin or complex thereof for using it as processing manufacture.

20. The conductive polymer composition according to claim 19, wherein the thermoplastic resin, thermosetting resin or complex thereof is contained 10–90% by weight of the total composition.

21. The conductive polymer composition according to claim 8, further comprising thermoplastic resin, thermosetting resin or complex thereof for using it as processing manufacture.

22. The conductive polymer composition according to claim 21, wherein the thermoplastic resin, thermosetting resin or complex thereof is contained 10–90% by weight of the total composition.

23. The conductive polymer composition according to claim 7, further comprising a dopant material of 50% by weight of a total weight of the conductive polymer and the soluble self-orienting material.

24. The conductive polymer composition according to claim 8, further comprising a dopant material of 50% by weight of a total weight of the conductive polymer and the soluble self-orienting material.

25. The conductive polymer composition according to claim 23, wherein the dopant material is independently selected from the group consisting of an inorganic photo-acid generating agent, an organic photo-acid generating agent, and a polymeric photo-acid generating agent.

26. The conductive polymer composition according to claim 24, wherein the dopant material is independently selected from the group consisting of an inorganic photo-acid generating agent, an organic photo-acid generating group, and a polymeric photo-acid generating agent.

27. The conductive polymer composition according to claim 23, wherein the inorganic photo-acid generating agent is triphenylsulfoniumhexafluoroantimonate.

28. The conductive polymer composition according to claim 24, wherein the inorganic photo-acid generating agent is triphenylsulfoniumhexafluoroantimonate.

29. The conductive polymer composition according to claim 23, wherein the organic photo-acid generating agent is triphenylsulfonyloxynorboneneimide.

30. The conductive polymer composition according to claim 24, wherein the organic photo-acid generating agent is triphenylsulfonyloxynorboneneimide.

31. The conductive polymer composition according to claim 23, wherein the polymeric photo-acid generating agent is poly(vinyl chloride).

32. The conductive polymer composition according to claim 24, wherein the polymeric photo-acid generating agent is poly(vinyl chloride).

* * * * *

UNITED STATES PATENT AND TRADEMARK OFFICE
CERTIFICATE OF CORRECTION

| | | |
|---|---|---|
| PATENT NO. | : 7,067,229 B2 | |
| APPLICATION NO. | : 10/472877 | |
| DATED | : June 27, 2006 | |
| INVENTOR(S) | : Suck-Hyun Lee et al. | |

It is certified that error appears in the above-identified patent and that said Letters Patent is hereby corrected as shown below:

In column 6, line 41 "weherein" should be --wherein--.

In column 8, line 30 "dopnats" should be --dopants--.

In column 11, line 37 "$cm^{-1}$" should be --cm-1--.

In column 12, line 7 "mm" should be --nm--.

In column 13, line 45 "Aafter" should be --After--.

In column 14, line 34 "polyphenoxyalkyl-maidesulfinic" should be --polyphenoxyalkyla-mide sulfonic--.

In column 15, line 45 "thermochenical" should be --thermochemical--.

Signed and Sealed this

Sixteenth Day of October, 2007

JON W. DUDAS
*Director of the United States Patent and Trademark Office*